United States Patent
Ryu (12) 
(10) Patent No.: US 6,384,941 B1
(45) Date of Patent: May 7, 2002

(54) APPARATUS FOR IMAGE CORRECTION OF MULTIFUNCTIONAL PERIPHERALS AND METHOD THEREFOR

(75) Inventor: Yeong-Eek Ryu, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/185,736

(22) Filed: Nov. 4, 1998

(30) Foreign Application Priority Data

Nov. 4, 1997 (KR) .......................................... 97-57863

(51) Int. Cl.⁷ ................................................ H04N 1/04
(52) U.S. Cl. ...................................... 358/474; 382/274
(58) Field of Search ............................... 358/474, 445, 358/446, 461, 497; 382/274, 284

(56) References Cited

U.S. PATENT DOCUMENTS

| | | | |
|---|---|---|---|
| 5,510,896 A | * 4/1996 | Walfer | 358/406 |
| 5,892,590 A | * 4/1999 | Ida | 358/406 |
| 5,987,186 A | * 11/1999 | Oida | 382/274 |

FOREIGN PATENT DOCUMENTS

JP 09160842 * 6/1997 ................. 358/294

* cited by examiner

Primary Examiner—Jerome Grant, II
Assistant Examiner—Negussie Worku
(74) Attorney, Agent, or Firm—Robert E. Bushnell, Esq.

(57) ABSTRACT

The present invention relates to the image correction device of the combination apparatus for eliminating the step difference of the image data by compensating the image step difference quantity occurring according to the environment or the transport or the assembly allowance of the carriage mechanism automatically when the data are read with the shuttle scanner module used as the reading means of the data, the image is corrected automatically within the system itself by correcting the wrong data with the image correction table and recording on the buffer by first reading the beginning data at the beginning driving of the system so the production time is reduced and the cost of the apparatus is lowered as the result of the reduction of the prim cost and the precise image is secured because the image is corrected automatically also under shocks in movement or the environment when a user buys and transports and uses it after it has been produced, therefore the reliability of the product improves.

47 Claims, 9 Drawing Sheets

| NO \ DEVIATION | 1 | 2 | 3 | 4 | 5 | 6 | 7 |
|---|---|---|---|---|---|---|---|
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 0 | 0 | 0 | 0 | 0 | 0 |
| 20 | 0 | 0 | 0 | 0 | 0 | 0 | 0 |
| 38 | 0 | 0 | 0 | 1 | 1 | 1 | 1 |
| 39 | 0 | 0 | 0 | 1 | 1 | 1 | 1 |
| 40 | 0 | 0 | 1 | 1 | 1 | 1 | 1 |
| 124 | 1 | 2 | 3 | 3 | 4 | 5 | 6 |
| 125 | 1 | 2 | ③ | 3 | 4 | 5 | 6 |
| 126 | 1 | 2 | 3 | 3 | 4 | 5 | 6 |
| 127 | 1 | 2 | 3 | 3 | 4 | 5 | 6 |
| 128 | 1 | 2 | 3 | 3 | 4 | 5 | 6 |
| 154 | 1 | 2 | 3 | 4 | 5 | 6 | 7 |
| 155 | 1 | 2 | 3 | 4 | 5 | 6 | 7 |
| 156 | 1 | 2 | 3 | ④ | 5 | 6 | 7 |
| 157 | 1 | 2 | 3 | 4 | 5 | 6 | 7 |
| 158 | 1 | 2 | 3 | 4 | 5 | 6 | 7 |
| 159 | 1 | 2 | 3 | 4 | 5 | 6 | 7 |
| 160 | 1 | 2 | 3 | 4 | 5 | 6 | 7 |

APPARATUS FOR IMAGE CORRECTION OF MULTIFUNCTIONAL PERIPHERALS AND METHOD THEREFOR

CLAIM OF PRIORITY

This application makes reference to, incorporates the same herein, and claims all benefits accruing under 35 U.S.C.§119 from an application entitled IMAGE PICTURE CONTROL DEVICE OF MULTIFUNCTION PERIPHERALS AND CONTROL METHOD THEREOF earlier filed in the Korean Industrial Property Office on the 4th day of Nov. 1997, and there duly assigned Ser. No. 97-57863, a copy of which is annexed hereto.

BACKGROUND OF THE INVENTION

1. Technical Field

The present invention relates to an image correction device eliminating a deviation in image data, and more particularly to an image correction device eliminating a deviation in image data during scanning operations.

2. Related Art

Multimedia systems that are driven to present combinations of moving and still pictures, sound, music, and words, are pervasive in the industrialized world, especially in computers or in other entertainment appliances. Concurrent with the development of multimedia computer systems, peripheral equipment including image formation equipment such as printers, have been incrementally modified to provide various functions.

A multi-tasking system, employing an inkjet mechanism and serving as a facsimile and scanner, can be coupled to an external personal computer that performs a user-selected program and generates print data. The multi-tasking system can either receive data from the personal computer or scan data printed on the exposed surface of one or more documents. Multi-tasking systems include a scanner, a printer, a facsimile system, and a copier. The scanner can be a laser flatbed or sheetfed scanner, for reading information existing on a document by scanning the document. With a sheetfed laser scanner, the scanner remains in a fixed state while the document bearing the information is moved in a vertical direction during laser scanning of its exposed surface. With a flatbed laser scanner, a laser beam is swept across a flat plate by the scanner modulated by video signals from a similar reading system or by digital signals generated by a computer.

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem a hard disk storage device, and a printer. A computer system's main board, which is a printed circuit board known as a motherboard, is used to electrically connect these components together.

A scanner is designed to convert images recorded on a document into a computer-compatible electronic form. The images recorded on the document can be scanned as follows. An amount of light is first transmitted to the document from a source. As a result, the image data on the document causes some of that light to be reflected in a particular pattern The pattern of reflected light is then supplied to a fixed array of light sensors through an intermediate image reduction mirror. The light sensors in the array can be charge-coupled devices (CCD) or contact image sensors (CIS). Then circuitry in the scanner senses the status of each sensing element in the array one by one, in order, to register the brightness of each point in each individual scan line. After the scanner has collected and arranged the data from each sensor, the next line of data can be read. Image data read from a document can be recorded onto a recordable medium. Image data read from a document can be considered as scanned data or scan data.

There are two main categories of scanner devices: the shuttle type and the array type. The array type shall be considered first. The array type of scanner scans the data recorded on the document per line unit, when a line scanner module having a size similar to, or larger than, the width of the document is fixed at a predetermined position inside of the multifunctional device. The scanner module can be stationary while the document is transported along a path of conveyance through the scanner device. However, the scanner module can be moved while the document is stationary. In addition, the scanner module can be moved while the document is transported.

The shuttle type of scanner can be described as follows. The shuttle type of scanner can have a guide axis, a transporting belt, and a driving source for driving the transporting belt, which are all established at the scanning unit, in order to reciprocate the scanner module perpendicular to the document transporting direction. Thus, the scanner module can be transported back and forth along a first path while the document is transported along a second path through the scanner device, the first and second paths being perpendicular to one another.

A printer used in an office or in a narrow place is an output device for making documents by outputting in form of the letters on the paper sheets for printing the data, letters or graphics made out from the computer, and a copier is a device for copying the data of form of documents or images as they are on the papers, and a facsimile is a device for transmitting the needed data to the people in the long distance in order that they can see them directly.

Each device of these office systems has one's own function according to independent forms one another, and so these are difficult to install together in case of the narrow office or space. Recently, in order to solve such problems, complex products with the functions of each sorts of office system are on the market.

Errors can occur during scanning due to a mechanical allowance or other conditions of a carriage mechanism and a carriage shaft of a shuttle scanner. When errors occur during scanning, the errors must be corrected.

I have discovered that there is a need to provide an improved, efficient multi-functional apparatus able to correct errors during scanning operations.

SUMMARY OF THE INVENTION

Accordingly, in order to provide an improved, efficient multi-functional apparatus able to correct errors during scanning operations, it is therefore an object of the present invention to let the image be corrected automatically within the system itself by correcting the wrong data with the image correction table and recording on the buffer by reading first the beginning data at the beginning driving of the system even though a worker does not assemble in correcting the position of the scanning assembly according to the scanning waveform read at producing a scanner at the factory.

To achieve these and other advantages and in accordance with the principles of the present invention, as embodied and broadly described, there is provided an image correction device having the base sheet signed by the reference line as the beginning data within the moval block when the carriage mechanism having the scanner module moves left, right and the image correction table for correcting it at the wrong documents or papers.

The device compensates the deviation by changing a line abreast the data scanned through memorizing the deviation quantity by reading the reference line signed by the beginning data at driving of the carriage mechanism.

Further, the device corrects the deviation uniformly after changing a line abreast the data scanned as much as the deviation quantity memorized by reading at the beginning scanning.

The present invention is more specifically described in the following paragraphs by reference to the drawings attached only by way of example. Other advantages and features will become apparent from the following description and from the claims.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
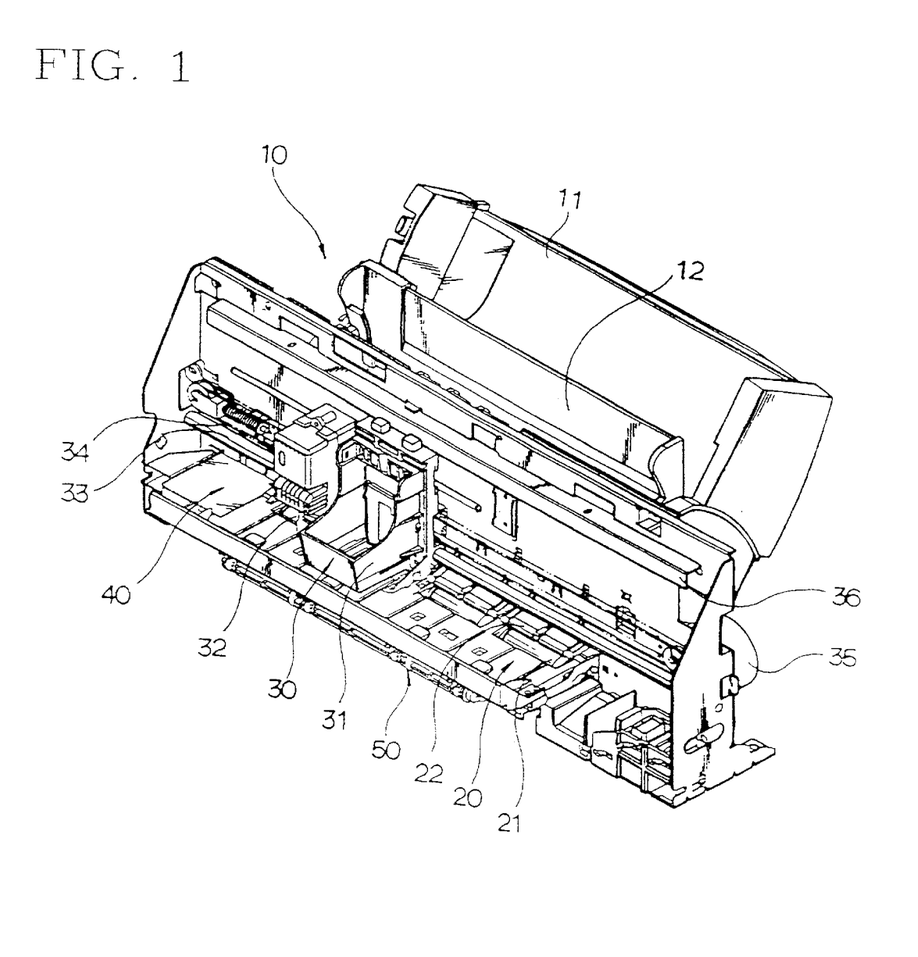
FIG. 1 illustrates a multi-functional apparatus.

Turn now to FIG. 1, which illustrates a multi-functional apparatus. In addition, turn to FIG. 2, which illustrates a front view of the apparatus of FIG. 1. Also, refer to FIG. 3, which illustrates a carriage mechanism of the apparatus of FIG. 1.

Figure 2:
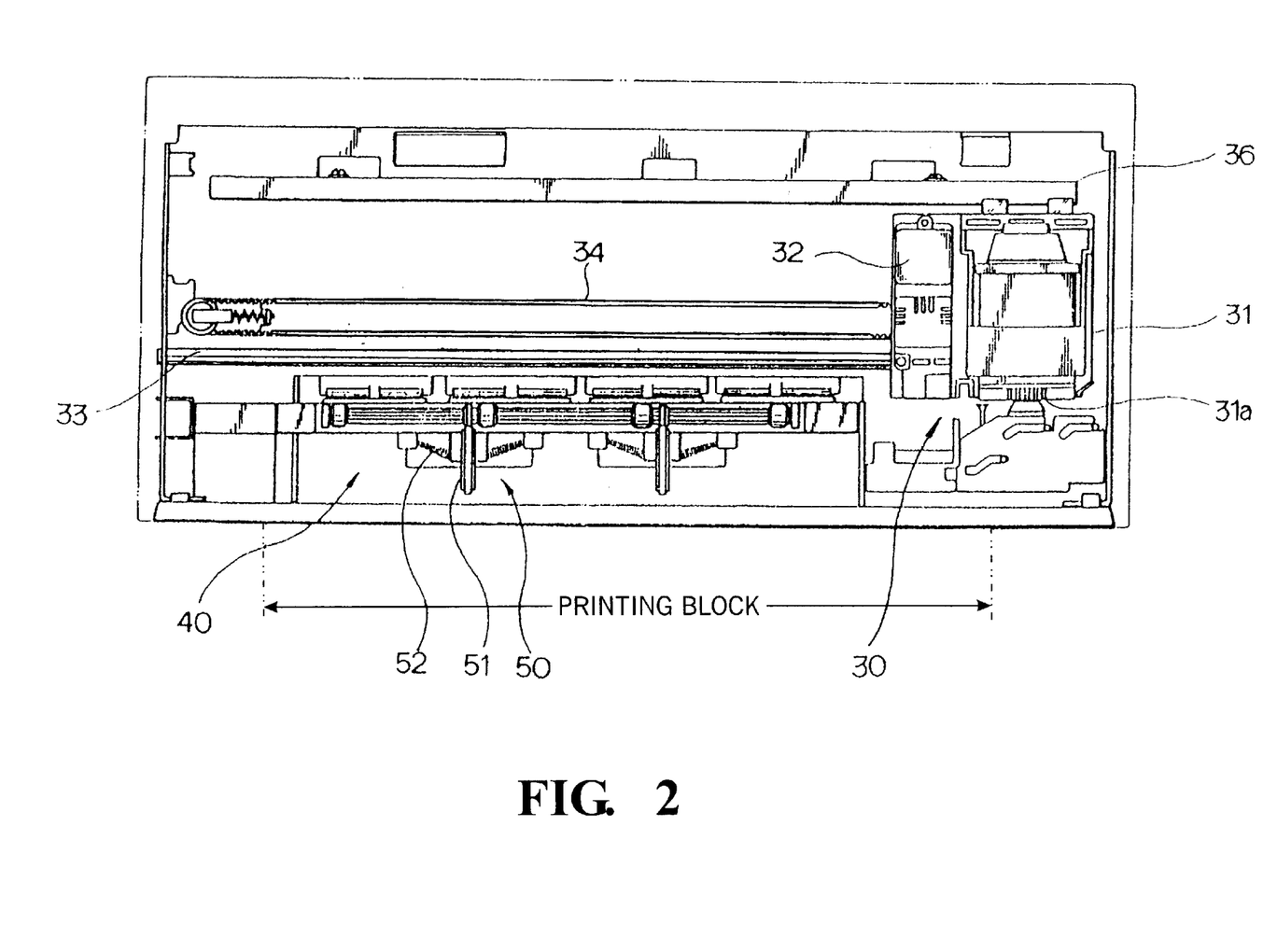
FIG. 2 illustrates a front view of the apparatus of FIG. 1.
Figure 3:
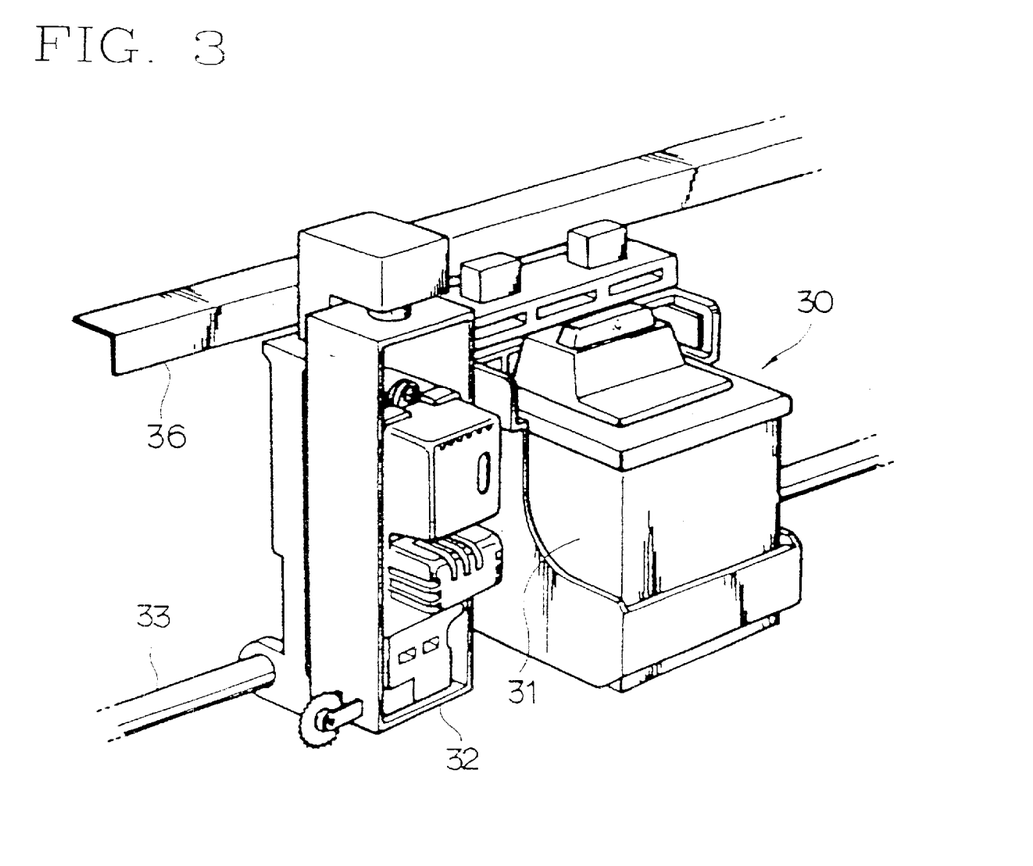
FIG. 3 illustrates a carriage mechanism of the apparatus of FIG. 1.

First, the structure of the combination apparatus with shuttle scanner in conjunction with FIGS. 1 through 3 is as follows. As illustrated, the apparatus has a paper feed part 10 composed of a one by one paper feed mode 12 for feeding the papers or documents one sheet by one sheet and an auto paper feed mode 11 for feeding the papers consecutively on the most upper part, and a user can control it as he wants and thereby can convert the mode. When the papers and the documents are inserted into the paper feed part 10 according to the mode conversion, the feeding for printing is performed by the pressure of a feed roller 21 and a friction roller 22. A guide rail 36 and a carriage mechanism 30 are shown.

When the paper or the document is feed by the feed roller 21 and the friction roller 22, in the carriage mechanism having a printer head module 31 for printing and a scanning module 32 adopting the shuttle method for scanning as illustrated in FIG. 3, a carriage return motor 35 as a driving source drives rotatively and a belt 34 driving in connection with this comes to rotate.

Accordingly, the carriage mechanism with the printer head module 31 and the scanner module 32 is bounded by the belt 34, reciprocates in left or right movement sliding along a carriage shaft 33 and the surface of the paper or document. That is, the data made out from the computer are printed and made as documents by jetting the ink on the printing paper through a nozzle 31a mounted on the printer head module 31 when the print command is issued, and the scanner module 32 is driven and scans the document in left or right movement when the scan command is issued. The print papers or the document printed by the printer head module are discharged by passing between a discharge roller 51 and a star wheel 52 after passing through a base frame 40 as a paper or document upholder.

Figure 4:
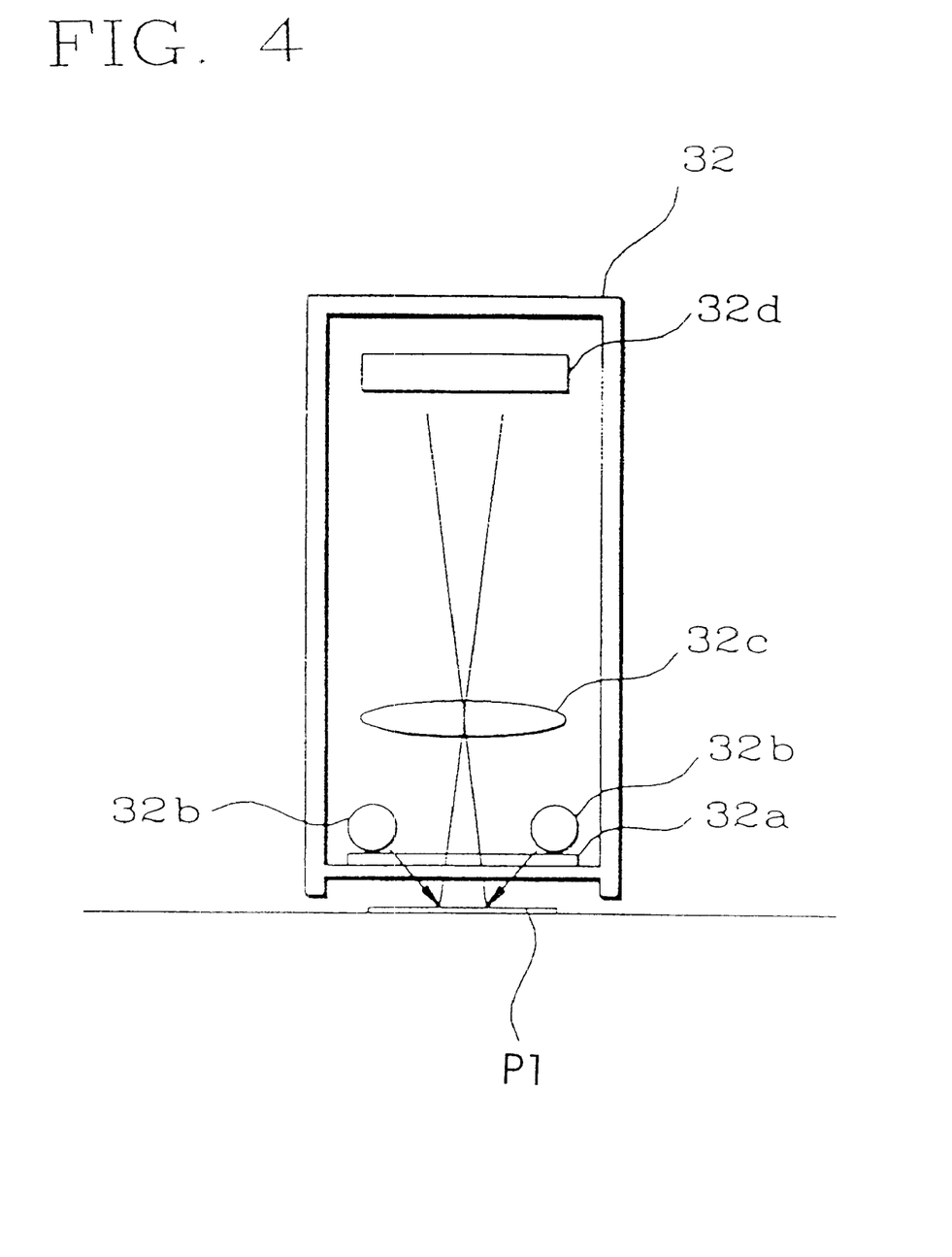
FIG. 4 illustrates a scanner module of the carriage mechanism of FIG. 3.

Turn now to FIG. 4, which illustrates a scanner module of the carriage mechanism of FIG. 3. Here, the inner structure of the scanner module for scanning the documents can be described in conjunction with FIG. 4 as follows.

A lamp 32b of the scanner module 32 applies the light to the document and the reflecting light reflected from the document passes through a glass 32a. The reflecting light passes through a lens 32c and is read and converted by a charge coupled device (CCD) sensor 32d as a device converting the light into the electric sources. In other words, the sensor 32d converts reflected light into electrical signals.

Figure 5:
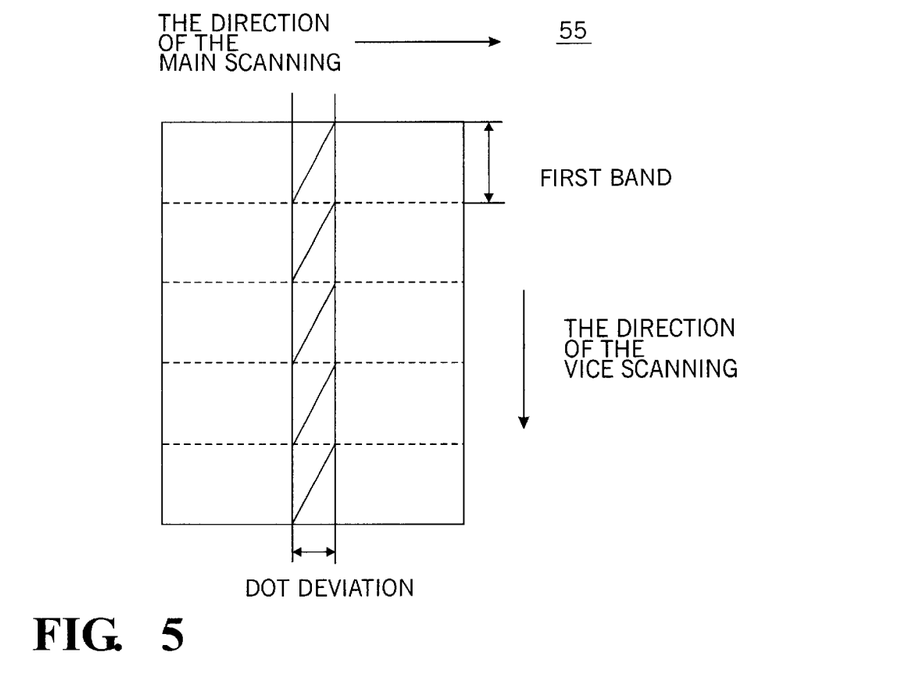
FIG. 5 illustrates a step difference occurring during scanning.

Turn now to FIG. 5, which illustrates a step difference 55 occurring during scanning. The carriage mechanism 30 combining the scanner module 32 and the printer module 31, as in FIG. 2, is fixed to a guide rail 36 and the canner module 32 scans in movement of from right to left along the carriage shaft 33. Here, errors in recognizing images occur due to a mechanical allowance or other conditions of the carriage mechanism 30 and the carriage shaft 33. As a result of the scanning of the data as a real straight line, the step difference 55 with a certain declination in the paper moving direction, as shown in FIG. 5, occurs and so must be corrected.

Accordingly, in order to solve said problems, the scanner modules are made by jig production when produced in the factory in case of the shuttle method and are assembled through correcting the position of the scanner assembly artificially according to the scanning data read at assembling.

But, this method is difficult because of assembling the scanner module 32 through correcting the position of the scanner assembly artificially according to the scanning data read at assembling through jig production and so needs a lot of time to produce. Further, when using the scanner module 32 corrected as described above, it is difficult to guarantee the correctness of a minute image when it becomes a little bit wrong due to a shock in movement or an environment condition when a user buys and transports and uses it after being produced in the factory. Furthermore, the production line construction gets a restriction because the cover of the apparatus is assembled after the image correction work has been completed.

It will be apparent to those skilled in the art that various modification can be made in the image correction device of combination apparatus and method therefor of the present invention, without departing from the spirit of the invention. Thus, it is intended that the present invention cover such modifications as well as variations thereof, within the scope of the appended claims and their equivalents.

The constitution and operation of the present invention can be described in detail in conjunction with the accompanying drawings as follows. Turn now to FIG. 6, which illustrates a multi-functional apparatus in accordance with the principles of the present invention. In addition, turn to FIG. 7, which illustrates an image correction table 70 used in conjunction with the apparatus of FIG. 6, in accordance with the principles of the present invention.

Figure 6:
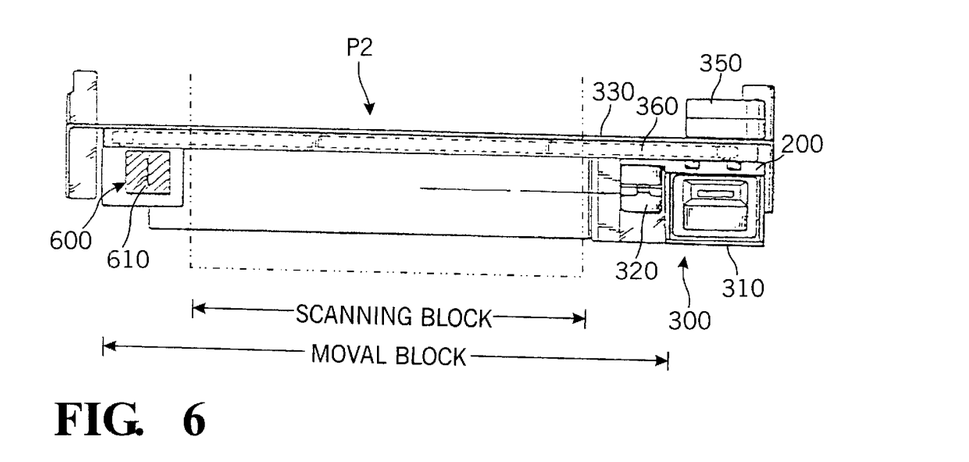
FIG. 6 illustrates a multi-functional apparatus in accordance with the principles of the present invention.
Figure 7:
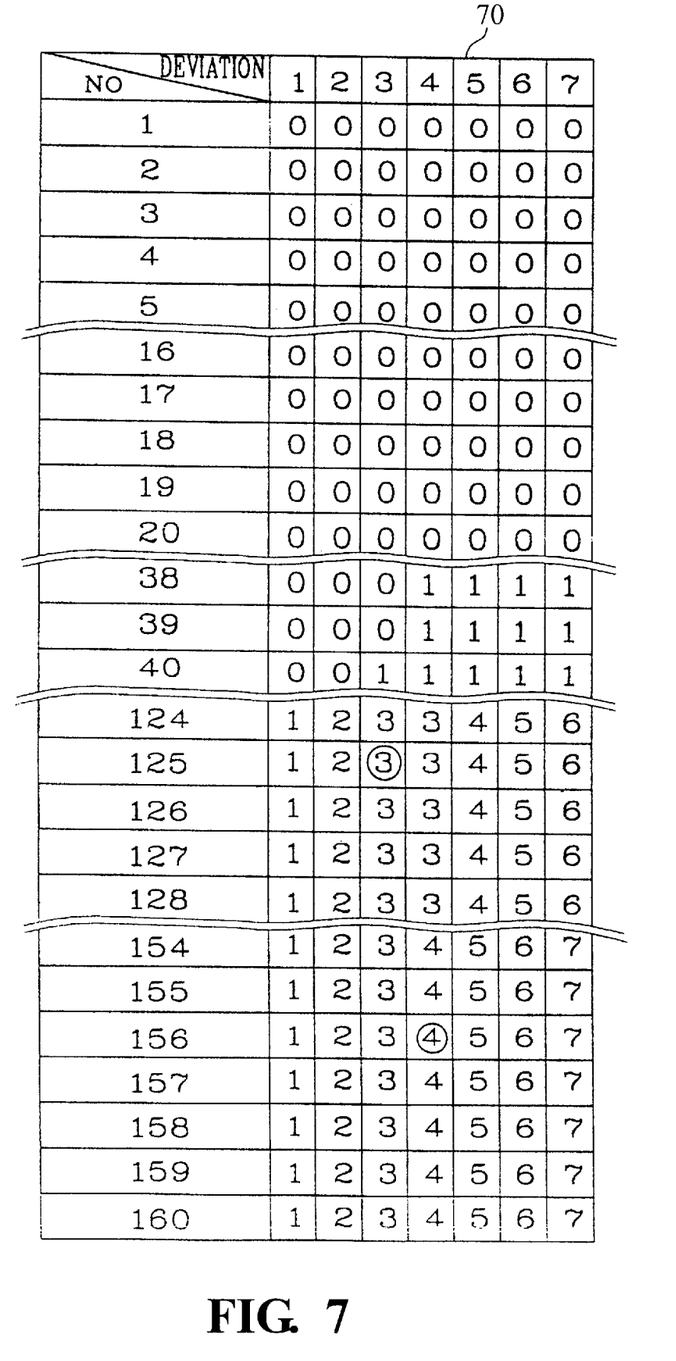
FIG. 7 illustrates an image correction table used in conjunction with the apparatus of FIG. 6, in accordance with the principles of the present invention.

FIGS. 6 and 7 illustrate the first embodiment according to the present invention. FIG. 6 illustrates a front view according to the present invention, and FIG. 7 illustrates an image correction table 70. FIG. 6 includes a printer head module 310, a guide rail 360, a carriage return motor 350, a scanner module 320, a carriage shaft 330, a base sheet 600, a reference line 610, and a carriage mechanism 300. As illustrated, the printer head module 310 of printing by storing the ink for making the data made out from the computer into documents and jetting the ink on the paper through nozzles mounted on the printer head module 310 according to the print command is mounted on the inner right side of the carriage mechanism 300 and the scanner module 320 of shuttle method for scanning documents is mounted on the inner left side of the carriage mechanism 300.

Likewise, the upper side of the carriage mechanism 300 having the scanner module 320 for scanning documents and the printer head module 310 for printing is fixed to the guide rail 360, and reciprocates in left, right sliding along the carriage shaft 330. Accordingly, the mechanism prints the data made out from the computer according to the print command by jetting the ink through nozzles of the printer head module 310 or scans the data of documents for scanning through the scanner module 320.

In addition, the base sheet 600 signed by the reference line 610, namely the beginning data within the moval block at transporting the scanner in spite of being outside of the valid scanning block of the scanner is mounted on the left side of the apparatus in FIG. 6. And the image correction table 70 for correcting such a step difference as FIG. 5 is added to the present invention as in FIG. 7. The data of the image correction table 70 of FIG. 7 can be stored in the apparatus shown in FIG. 6.

The operation process and method according to such a constitution be considered more in detail as follows. The carriage mechanism 300 with the printer head module 310 for printing and the scanner module 320 for scanning documents scans in left, right movement along the carriage shaft 330, here the image quality can be influenced by the mechanical allowance of the carriage mechanism 300 and the carriage shaft 330.

Figure 8:
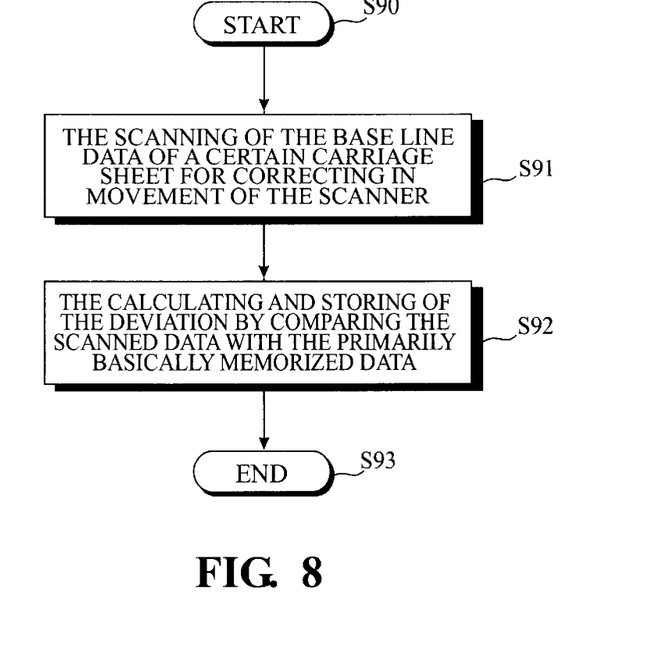
FIG. 8 illustrates a flow chart of a method of scanning the data of FIG. 5, in accordance with the principles of the present invention.

Turn now to FIG. 8, which illustrates a flowchart of a method of scanning the data of FIG. 5, in accordance with the principles of the present invention. In the discussion of FIG. 8 below, reference is made to features of FIGS. 5 through 8.

In FIG. 8, at step S90, the scanning operation begins. At step S91, the carriage mechanism 300, which includes the scanner module 320 and the printer head module 310, scans the reference line 610 data of the certain base sheet 600 in left and right movement at the beginning of the driving of the system as seen in FIG. 6.

In FIG. 8, at step S92, if the first band has 160 lines, the normal image can be gained when the image is compensated with the data of the image correction table 70 of FIG. 7 for each line of the scan band with the table 70 prepared for each deviation by checking the data deviation of the beginning- and final data in the 160 lines of the scan band and the beginning value in the image correction table.

Namely, table 70 of FIG. 7 indicates the deviation compensation value in case of the a deviation occurring fill 7 dot in the direction of the main scanning. For example, as illustrated in FIG. 7, when the deviation of 4 dot occurs in the direction of the main scanning, the 156th line needs to correct the 4 dot and the 125th line needs to correct the 3 dot in the paper moving direction.

Figure 9:
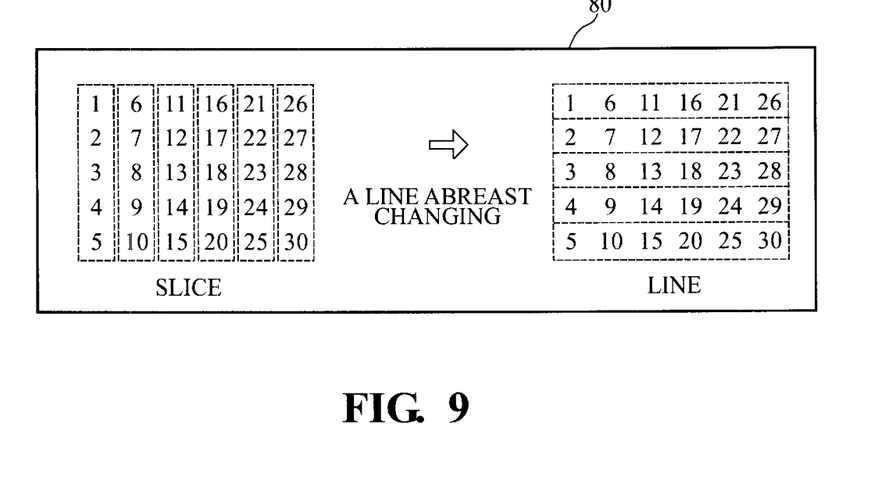
FIG. 9 illustrates the data utilized for a line abreast changing of the data according to FIG. 8, in accordance with the principles of the present invention.

Turn now to FIG. 9,which illustrates the data 80 utilized for a line abreast changing of the data according to FIG. 8, in accordance with the principles of the present invention. Also turn to FIG. 10, which illustrates a flowchart of a method of converting the data 80 of FIG. 9, in accordance with the principles of the present invention. The method for compensating the deviation can be explained with reference to FIGS. 9 and 10 as follows.

Figure 10:
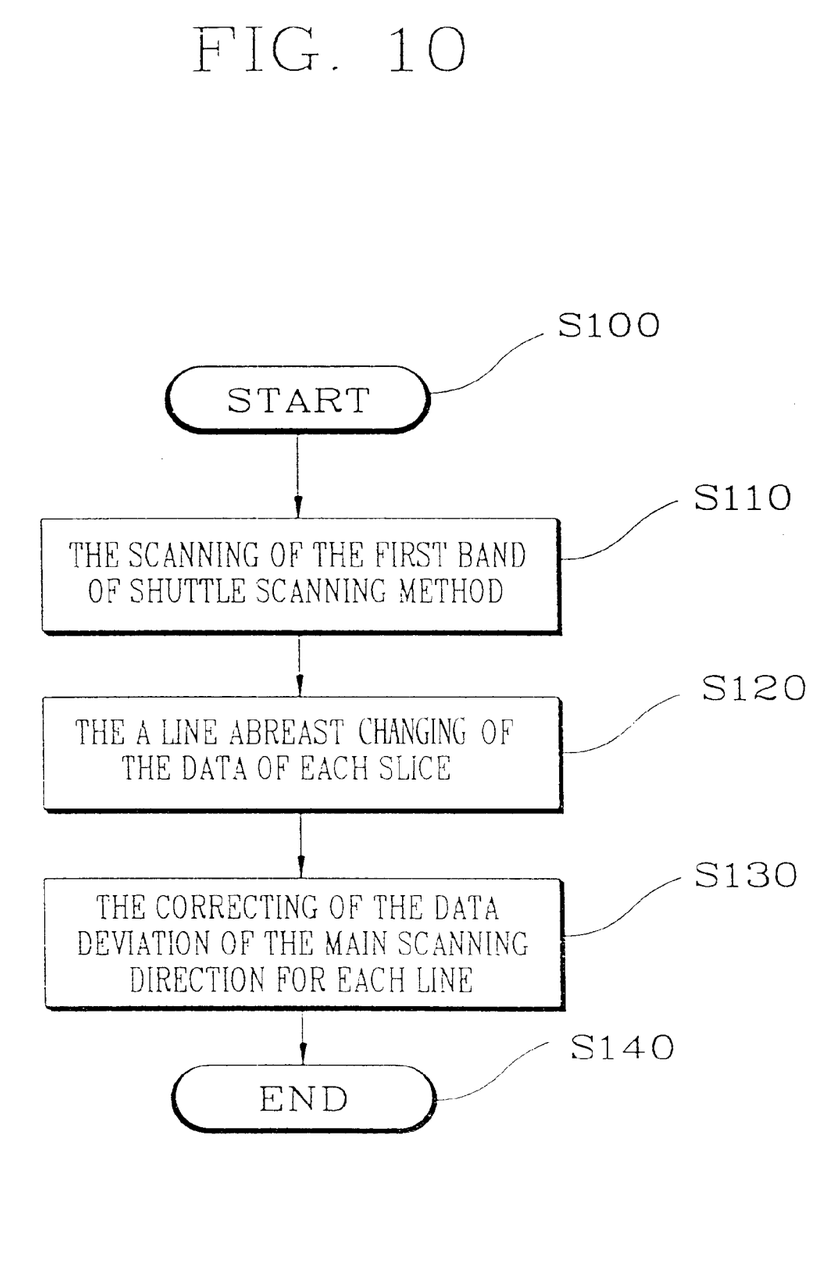
FIG. 10 illustrates a flowchart of a method of converting the data of FIG. 9, in accordance with the principles of the present invention.

In FIG. 10, at step S100, the operations begin. At step S110, the data of each slice in the direction of the vice scanning have to be changed a line abreast, when each 5 dots are scanned in the direction of the vice scanning, namely 1 band is scanned. At step S120, the data of the direction of is the vice scanning 1, 2, 3, 4, 5 have to be changed a line abreast S120 in the direction of the main scanning when there are 5 dots within 1 band as illustrated in FIG. 9. Namely, the first slice has to be converted into 1, 6, 11, 16, 21, 26. . . ,(and the second slice has to be converted into 2,7,12,17,22, 27. . . . In FIG. 10, at step S130, each line data changed a line abreast like this are corrected so much as the deviation memorized by reading the beginning value.

Figure 11:
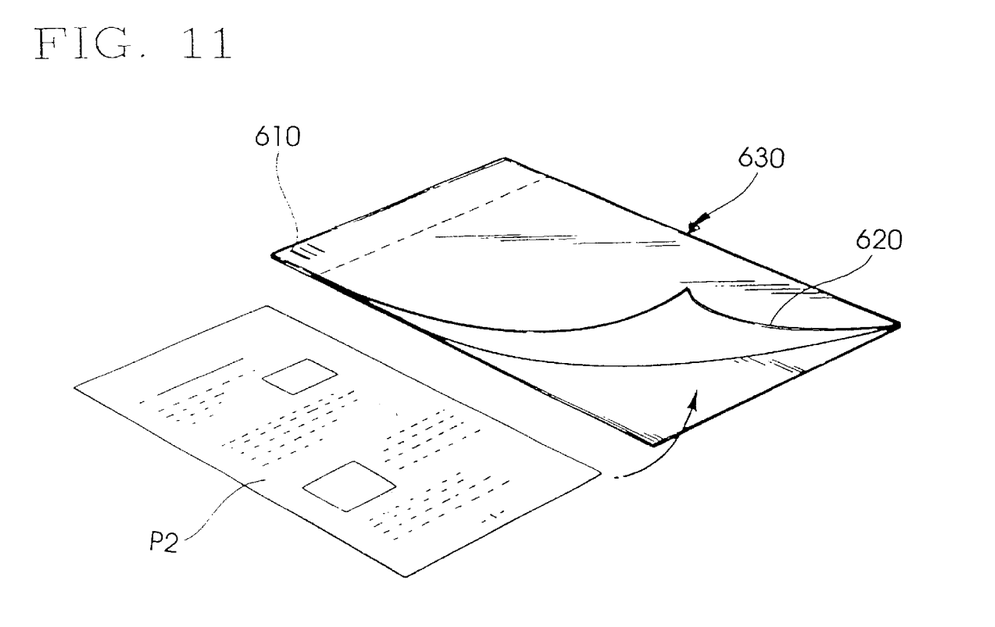
FIG. 11 illustrates an another embodiment of the present invention, in accordance with the principles of the present invention.

Turn now to FIG. 11, which illustrates another embodiment of the present invention, in accordance with the principles of the present invention. FIG. 11 illustrates another embodiment according to the present invention, the structure of the base sheet 600 (shown in FIG. 6) signed by the reference line 610 as the beginning data is changed and attached to the left upper portion of the carriage sheet.

Looking into the structure of the carrier sheet 630 signed by the reference line 610 as said beginning data, the reference line 610 recorded by the beginning data signed on the upper portion of the carrier sheet 630 has a clear sign of the thickness and the distance between lines in order to distinguish from other scan data, the transparent sheet 620 is attached thereto in order to prevent the pollution of the documents scanned by the scanner.

That is, the documents for scanning are scanned in being inserted between the carrier sheet 630 signed by the beginning data reference line and the transparent sheet 620, and the beginning data reference line 610 signed on the edge portion of carrier sheet 630 is first read and memorized and the wrong beginning data are corrected as much as the deviation quantity by the prepared table 70 of FIG. 7.

Hereinafter, the image correction method related to FIG. 11 is omitted because it corrects in same method as the first embodiment of the present invention which was discussed above with reference to FIGS. 5 through 10.

As explained above, in the apparatus combining the scanner module and the printer head module, the position of the scanner assembly is not artificially corrected and assembled according to the scanning data read at assembling through Jig production, and so the production time is reduced and the cost of the apparatus comes down as the result of the reduction of the prime cost and the precise image is secured because the image is corrected automatically also under shocks in movement or the environment when a user buys and uses it after it has been produced. Also, the production line can be freely constructed because the cover need not be assembled after the image correction has been finished.

The foregoing paragraphs describe the details of an image correction device of a combination apparatus, more particularly to an image correction device of a combination apparatus for eliminating a deviation of the image data by compensating automatically through recognizing the image step difference quantity occurring according to the environment condition or the assembly allowance or the movement of the carriage mechanism when reading the data with the shuttle scanner used as a means for reading data.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus comprising:
    a memory unit storing alignment correction data for correcting alignment of image data read from a surface or an original document;
    a carrier sheet having a reference image formed thereon;
    an optical reading unit reading said reference image from said carrier sheet to form reference data, reading the image data from the surface of the original document to form scan data when said optical reading unit is being transported along a first path of conveyance in a first direction across the surface of the original document, and reading the image data from the surface of the original document to form said scan data when said optical unit is being transported along a second path of conveyance in a second direction across the surface of the original document, the second direction being opposite to the first direction;
    a carriage return motor connected to said optical reading unit, performing a first plurality of rotation steps to transport said optical reading unit in the first direction, and performing a second plurality of rotation steps to transport said optical reading unit in the second direction;
    a control unit connected to said memory unit and said optical reading unit, receiving the alignment correction data from said memory unit, receiving the reference data corresponding to said reference image on said carrier sheet, controlling said optical reading unit, detecting said first and second pluralities of rotation steps of said carriage return motor, outputting an alignment correction signal according to the alignment correction data, and outputting an image correcting signal according to the reference data; and
    a motor controller connected to said control unit and said carriage return motor, receiving said alignment correction signal from said control unit, and controlling said first and second pluralities of rotation steps of said carriage return motor according to said alignment correction signal.

2. The apparatus of claim 1, where in said control unit corresponds to a microcomputer.

3. The apparatus of claim 1, wherein said reference image is located at a position adjacent to a first side of the original document, the first path of conveyance having a starting location at said reference image, and the second path of conveyance having an ending location at said reference image.

4. The apparatus of claim 3, wherein said control unit detects when said optical reading unit is located at said reference image.

5. The apparatus of claim 3, wherein said reference image further comprises a white pad having a line formed thereon.

6. The apparatus of claim 1, wherein said control unit outputs the alignment correction signal when said first plurality of rotation steps is not equal to said second plurality of rotation steps.

7. An apparatus, comprising:
    a scanner unit reading an alignment reference image selected from among a first reference image installed on said scanner unit and a second reference image borne by a carrier sheet, forming alignment data corresponding to said alignment reference image, reading image data from a surface of an original document, forming scan data corresponding to said image data; and
    a storage unit storing image correction data;
    said apparatus correcting alignment errors in said scan data by shifting a position of said scan data in accordance with said stored image correction data and said formed alignment data;
    when said reading of said alignment reference image corresponds to reading said seconds reference image borne on said carrier sheet, said carrier sheet carrying the original document.

8. The apparatus of claim 7, said shifting of a position of said scan data corresponding to a shifting of data blocks.

9. The apparatus of claim 7, said apparatus correcting said alignment errors when a determined direction of a first alignment error is a first direction by correcting the first alignment error in the first direction, and correcting said alignment errors when a determined direction of a second alignment error is a second direction by correcting the second alignment error in the second direction, the second direction being opposite to the first direction.

10. The apparatus of claim 9, said apparatus performing said correcting of the first alignment error in the first direction by shifting data blocks in the second direction.

11. The apparatus of claim 9, said apparatus performing said correcting of the first alignment error in the first direction by shifting data dots in the second direction.

12. The apparatus of claim 7, further comprising an image forming unit recording print data onto a recordable medium.

13. The apparatus of claim 12, said apparatus corresponding to a printer-scanner multifunctional device.

14. The apparatus of claim 7, said alignment reference image having predetermined characteristics distinguishable from characteristics of said image data of the original document.

15. The apparatus of claim 14, said predetermined characteristics of said alignment reference image including a line thickness and a line spacing.

16. The apparatus of claim 7, said first reference image being located at a position adjacent to the original document when said image data is being read from the surface of the original document.

17. The apparatus of claim 16, said shifting of a position of said scan data corresponding to a shifting of data blocks.

18. The apparatus of claim 16, said apparatus correcting said alignment errors when a determined direction of a first alignment error is a first direction by correcting the first alignment error in the first direction, and correcting said alignment errors when a determined direction of a second alignment error is a second direction by correcting the second alignment error in the second direction, the second direction being opposite to the first direction.

19. The apparatus of claim 18, said apparatus performing said correcting of the first alignment error in the first direction by shifting data blocks in the second direction.

20. The apparatus of claim 18, said apparatus performing said correcting of the first alignment error in the first direction by shifting data dots in the second direction.

21. The apparatus of claim 16, further comprising an image forming unit recording print data onto a recordable medium.

22. The apparatus of claim 21, said apparatus corresponding to a printer-scanner multifunctional device.

23. The apparatus of claim 16, said alignment reference image having predetermined characteristics distinguishable from characteristics of said image data of the original document.

24. The apparatus of claim 23, said predetermined characteristics of said alignment reference image including a line thickness and a line spacing.

25. The apparatus of claim 7, said second reference image being located near an edge of a transparent carrier, the original document being inside the transparent carrier when said scanner unit performs said reading of the original document.

26. The apparatus of claim 25, said shifting of a position of said scan data corresponding to a shifting of data blocks.

27. The apparatus of claim 25, said apparatus correcting said alignment errors when a determined direction of a first alignment error is a first direction by correcting the first alignment error in the first direction, and correcting said alignment errors when a determined direction of a second alignment error is a second direction by correcting the second alignment error in the second direction, the second direction being opposite to the first direction.

28. The apparatus of claim 27, said apparatus performing said correcting of the first alignment error in the first direction by shifting data blocks in the second direction.

29. The apparatus of claim 27, said apparatus performing said correcting of the first alignment error in the first direction by shifting data dots in the second direction.

30. The apparatus of claim 25, further comprising an image forming unit recording print data onto a recordable medium.

31. The apparatus of claim 30, said apparatus corresponding to a printer-scanner multifunctional device.

32. The apparatus of claim 25, said alignment reference image having predetermined characteristics distinguishable from characteristics of said image data of the original document.

33. The apparatus of claim 32, predetermined characteristics of said alignment reference image including a line thickness and a line spacing.

34. The apparatus of claim 7, said alignment reference image being located at a position adjacent to the original document when said reading of the image data is being performed by said scanner unit.

35. The apparatus of claim 34, said shifting of a position of said scan data corresponding to a shifting of data blocks.

36. The apparatus of claim 34, further comprising an image forming unit recording print data onto a recordable medium.

37. The apparatus of claim 36, said apparatus corresponding to a printer-scanner multifunctional device.

38. The apparatus of claim 34, said alignment reference image having predetermined characteristics distinguishable from characteristics of said image data of the original document.

39. The apparatus of claim 38, said predetermined characteristics of said alignment reference image including a line thickness and a line spacing.

40. The apparatus of claim 34, said apparatus correcting said alignment errors when a determined direction of a first alignment error is a first direction by correcting the first alignment error in the first direction, and correcting said alignment errors when a determined direction of a second alignment error is a second direction by correcting the second alignment error in the second direction, the second direction being opposite to the first direction.

41. The apparatus of claim 40, said apparatus performing said correcting of the first alignment error in the first direction by shifting data blocks in the second direction.

42. The apparatus of claim 40, said apparatus performing said correcting of the first alignment error in the first direction by shifting data dots in the second direction.

43. A method, comprising:

reading an alignment reference image select from among a reference image mounted on a scanner unit and a reference image borne by a carrier sheet, said alignment reference image being located adjacent to and spaced apart from an original document when said reading of said alignment reference image is performed;

reading an image borne by the original document, said reading of said alignment reference image and said reading of the image being performed by said scanner unit;

forming deviation data corresponding to said reading of said alignment reference image;

forming image data corresponding to said reading of the image; and correcting said image data in dependence upon said deviation data and upon image correction data stored in said scanner unit, said correcting of said image data compensating for a deviation in said image data;

when said reading of said alignment reference image corresponds to reading said alignment reference image located on said carrier sheet, said carrier sheet carrying the original document.

44. The method of claim 43, said alignment reference image having predetermined characteristics distinguishable from characteristics of the image borne by the original document, said predetermined characteristics of said alignment reference image including a line thickness and a line spacing.

45. The method of claim 44, said scanner unit corresponding to a shuttle scanner apparatus and not flatbed scanner apparatus, said scanner unit having a scanner being shuttled back and forth across a surface of the original document.

46. The method of claim 45, said reading of the image borne by the original document including a reading of at least a part of the image when said scanner is transported along a first path of conveyance in a first direction a cross the surface of the original document, and including reading of at least a part of the image when said scanner is transported along a second path of conveyance in a second direction across the surface of the original document, the second direction being opposite to the first direction.

47. The method of claim 46, the image borne by the original document corresponding to a plurality of lines and dots of data, said image correction data including a plurality of deviation compensation values, each of said deviation compensation values corresponding to a respective line and dot selected from among said plurality of lines and dots of data.

* * * * *